United States Patent
Bonne et al.

(10) Patent No.: US 6,184,773 B1
(45) Date of Patent: Feb. 6, 2001

(54) RUGGED FLUID FLOW AND PROPERTY MICROSENSOR

(75) Inventors: Ulrich Bonne, Hopkins; Aravind Padmanabhan, Plymouth, both of MN (US)

(73) Assignee: Honeywell Inc., Morristown, NJ (US)

(*) Notice: Under 35 U.S.C. 154(b), the term of this patent shall be extended for 0 days.

(21) Appl. No.: 09/207,165

(22) Filed: Dec. 7, 1998

(51) Int. Cl.[7] .................................................. H01L 3/04
(52) U.S. Cl. .......................... 338/25; 338/23; 73/204.25; 257/467
(58) Field of Search .......................... 73/204.26, 204.25, 73/204.11; 338/13, 23, 25; 257/467

(56) References Cited

U.S. PATENT DOCUMENTS

| | | | |
|---|---|---|---|
| 4,085,398 | * 4/1978 | Bertram et al. | 338/25 |
| 4,501,144 | 2/1985 | Higashi et al. | |
| 4,703,555 | * 11/1987 | Hubner | 29/611 |
| 4,914,742 | * 4/1990 | Higashi et al. | 428/620 |
| 5,056,362 | * 10/1991 | Ang et al. | 73/204.26 |
| 5,446,437 | * 8/1995 | Bantien et al. | 338/25 |
| 5,560,711 | * 10/1996 | Bu | 257/467 |
| 5,705,745 | 1/1998 | Truetler et al. | |

OTHER PUBLICATIONS

Ohnstein et al; "Environmentally Rugged Wide Dynamic Range Microstructure Airflow Sensor", IEEE Solid–State Sensor and Actuator Workshop, Hilton Head, SC, Jun. 1990, *Technical Digest,* p. 158.

Kim et al; "Thermocompression Bonding Effects on Bump–Pad Adhesion", *IEEE Transactions on Components, Packaging, and Manufacturing Technology*—Part B, vol. 18, No. 1, Feb. 1995.

Frampton et al; "Gas Mass Flow Sensor Proof of Concept Testing for Space Shuttle Orbiter Flow Measurement", *SAE Technical paper 961335,* Int'l. Conf. Env. Systems, Monteray, CA, Jul. 1996.

Bonne; "New Developments in Natural Gas Transducer Technology", 8th IGT Symposium on Gas Quality and Energy Measurement, Orlando, FL, Feb. 1997.

* cited by examiner

*Primary Examiner*—Karl D. Easthom
(74) *Attorney, Agent, or Firm*—Roz and W. Norris; Andrew A. Abeyta

(57) ABSTRACT

A thermal fluid flow or property sensor having no exposed contact wires or contact pads in the fluid flow path to obstruct measurements, flat fully passivated sensor surfaces and high corrosion resistance is implemented over a honeycombed thermal isolation chamber.

22 Claims, 3 Drawing Sheets

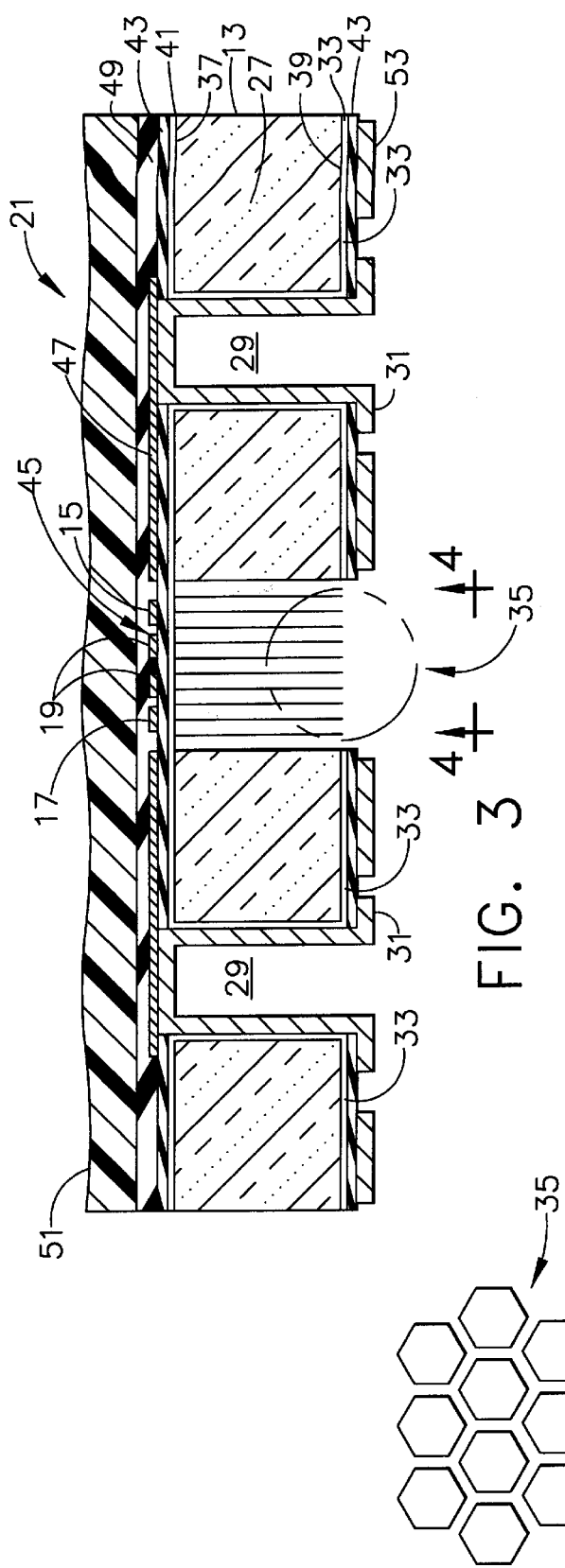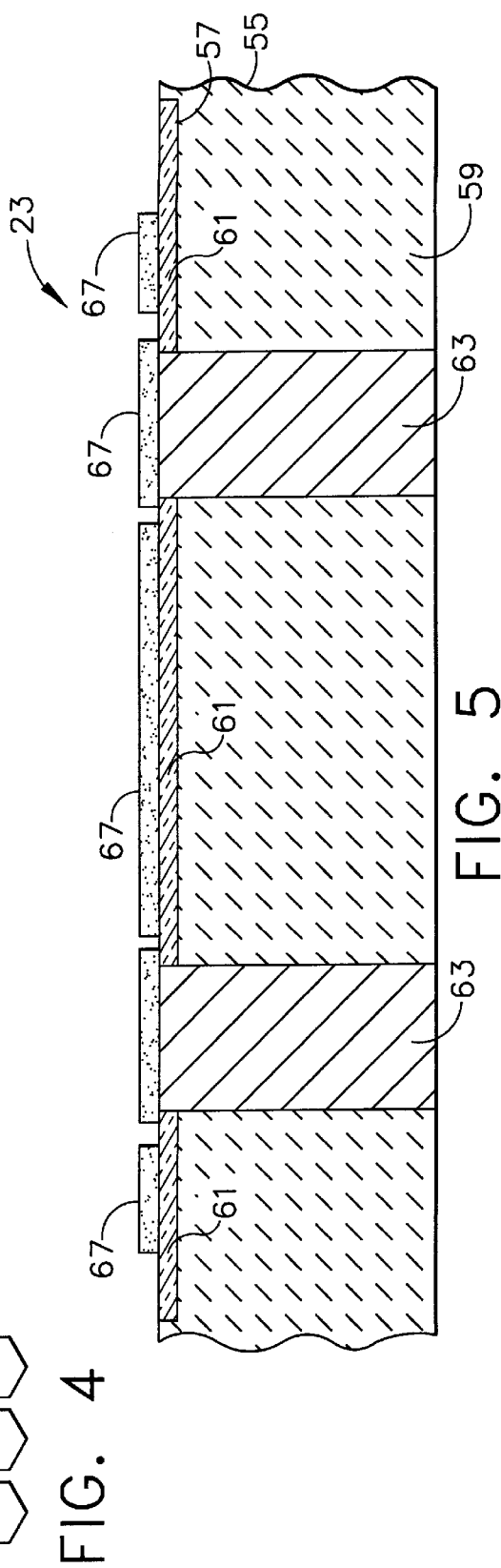

RUGGED FLUID FLOW AND PROPERTY MICROSENSOR

BACKGROUND OF THE INVENTION

1. Field of the Invention

This invention relates generally to thermal sensors of fluids, such as fluid flow or property sensors implemented on silicon in microstructure form. For convenience sake the term "flow sensor" will be used generically hereinafter for such thermal sensors. The reader will appreciate that such sensors may be utilized to measure primary properties such as temperature, thermal conductivity and specific heat; and that the flows may be generated through forced or natural convection. The invention relates more specifically to a sensor package of the microbridge or membrane type flow sensor having a central heating element and surrounding sensors which are capable of handling high pressure and have very low susceptibility to environmental damage or contamination.

2. Description of Related Art

Open microbridge structures such as detailed in U.S. Pat. No. 4,501,144, to Higashi, are well suited for measurements of clean gases, with or without large pressure fluctuations, since the microbridge structure is burst-proof. However, due to the open nature of the microbridge structure, condensates from vapor can be uncontrollably retained in the microbridge structure leading to uncontrolled changes in its thermal response, or output, making the structure susceptible to output error and poor stability. Also, in the typical microbridge structure, the silicon die is wire bonded at the top surface to a header, or substrate, carrying further electrical leads and/or electronics. Typically, such wire for the wire bonds would be a one mil gold wire. This wire has a further tendency to retain liquid condensates, increase undesirable turbulence, shift flow response. Due to its thinness, the wire is susceptible to damage in a high mass flux environment, such as liquid flow, and upon attempts to clean the sensor.

Membrane-based sensors such as shown in U.S. Pat. No. 5,705,745, to Treutler et al., overcome some of the problems of the microbridge structure because there is no opening between the bridge and the underlying thermal isolation cavity or air space. However, because the membrane is sealed over the isolation air space membrane based sensors have limited application in constant, near-atmospheric pressure, because the membrane can deform or burst as pressure differences increase above 100 PSI. The top surface of the membrane sensors is also typically wire bonded, leaving the problem of the wire in the flow path accumulating debris and possible breakage during cleaning attempts.

It would therefore be desirable to develop a flow sensor which is not susceptible to the above problems of vapor accumulation beneath the microbridge, poor ruggedness under high pressure capability of the membrane sensors, and exposed bonding wire near the heating and sensing elements. The design of such a structure would enable high pressure thermal property sensing over wide ranges at a reasonable cost and provide trouble free operation in heretofore hostile environments.

SUMMARY OF THE INVENTION

The present invention details a microstructure flow sensor having a silicon microsensor die with a micromembrane or microbridge sensing structure and through-the-wafer electrical contacts as well as a wide pressure range support structure consisting of a micromachined, back-etched honeycomb structure. A flat, passivated, top surface overlying the heater and sensor elements is featured on the silicon die. The silicon die, with its through-the-wafer electrical contacts, eliminates the need for bonding wires with their attendant problems as discussed above.

The die is attached to a substrate having a suitably matched coefficient of thermal expansion (CTE) by thermo-compression bonding, solder bumping, adhesives or the like, preferably containing through-the-substrate electrical contacts terminating in the necessary electrically conductive runs for attachment to further electronics of the sensor.

The substrate may further have a glazing layer at the mating surface with the silicon die in order to provide a fluid barrier to the bottom of the die and back fill seals to prevent access to the back-side contacts and open ends of the honeycomb or micromembrane. Both silicon oxide and silicon nitride layers are used in the construction of the die. The present invention will benefit the user by trouble free and reliable service in all fluid flow applications as well as being easily fabricated and easily subjected to periodic maintenance.

BRIEF DESCRIPTION OF THE DRAWINGS

The present invention will be more fully and completely understood from a reading of the Description of the Preferred Embodiment in conjunction with the drawings, in which:

FIG. 3 is a detailed schematic cross section of the silicon micro sensor die portion of the present invention.

FIG. 4 is a detail of the honeycomb structure of FIG. 3.

FIG. 5 is a detailed schematic cross section of the substrate structure to which the die is attached.

DESCRIPTION OF THE PREFERRED EMBODIMENT

Figure 1:
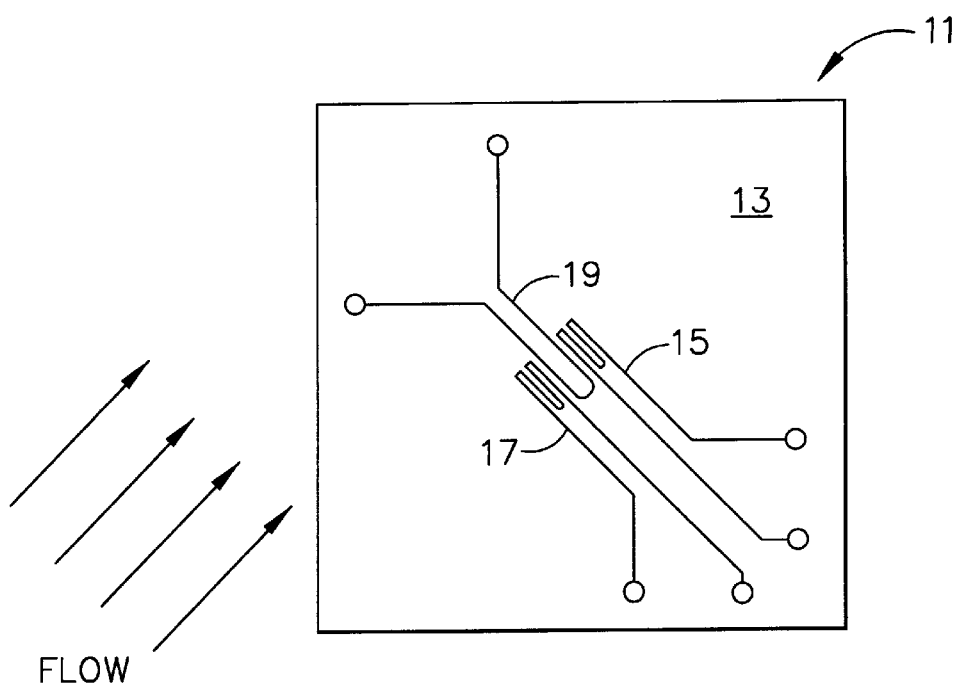
FIG. 1 is a top view of the silicon microsensor die showing the micromembrane heating and sensing elements.

Throughout the Description of the Preferred Embodiment, like components will be identified by like reference numerals.

Referencing FIG. 1, a fluid flow sensing array 11 is implemented on a silicon substrate or body 13. Onto the silicon substrate 13 are plated sensor elements 15, 17 surrounding a central heating element 19 composed of a suitable metal, such as platinum. The arrangement and theory of operation for a microstructure fluid flow sensor of this type is known to those in the art and will not further elaborated on herein.

Figure 2:
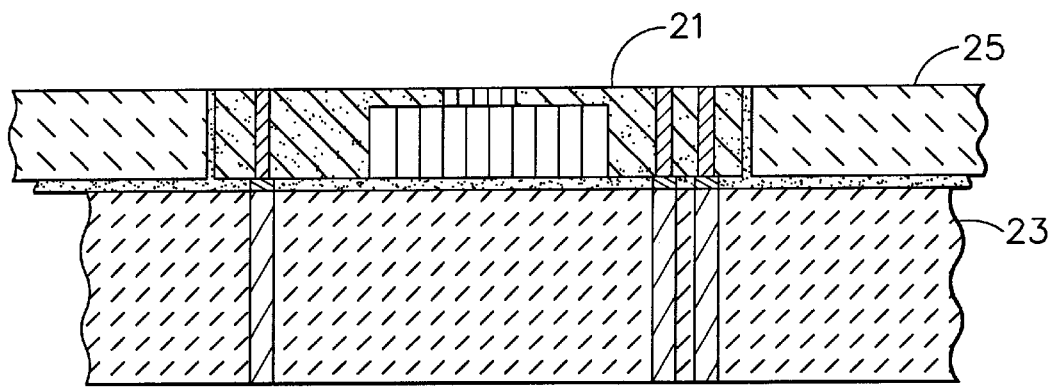
FIG. 2 is a cross section of a fluid flow sensor according to the present invention including a substrate structure and a top surround portion further planarizing the portion of the sensor exposed to fluid flow.
Figure 6:
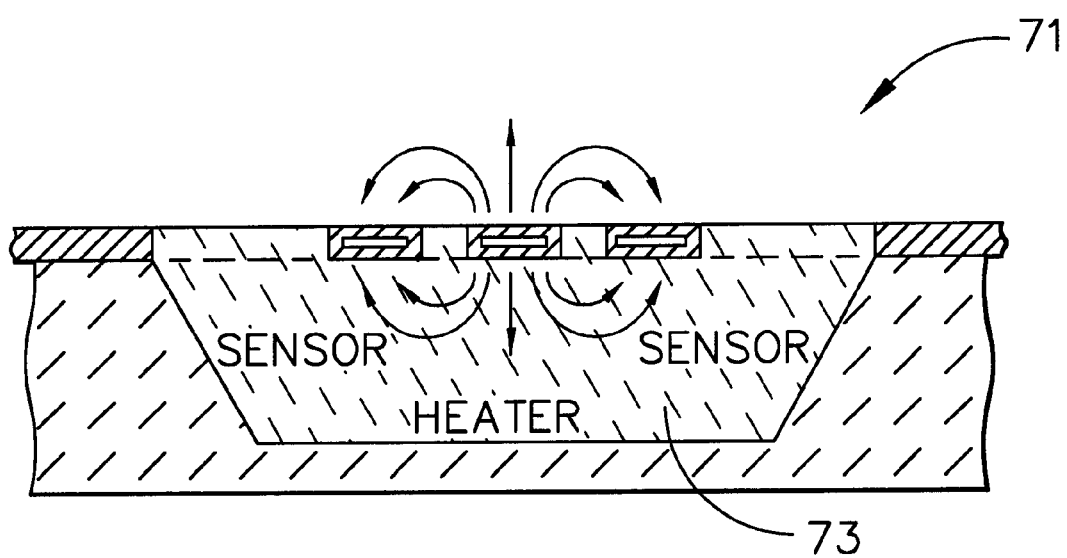
FIG. 6 is a schematic cross section of an alternative fluid sensor to that of FIG. 1.

Referencing in FIG. 2, a flow sensor according to the present invention may include a silicon microsensor die 21 bonded to a larger substrate 23 having a suitably matched coefficient of thermal expansion. Material for the substrate may include alumina, mullite, or known printed circuit board material having suitable CTE. A top surround body, or layer, 25 is placed on the substrate 23 to surround the silicon microsensor die 21 in order to further planarize the top surface of the sensing apparatus and prevent minimal resistance to fluid flow and minimal crevices into which particles or condensates may lodge. The top surround 25 may be implemented as an epoxy layer, a preform, or any suitably constructed and arranged deposition or structural layer serving the above noted purposes. The joints between substrate 23, die, 21, and top surround 25 may be further sealed or smoothed with a suitable epoxy or the like to remove potential dust and vapor traps.

Referencing FIG. 3, the silicon microsensor die 21 comprises a silicon body 13 having etched through-holes serving as electrical vias, collectively 29, whose walls are plated with an electrical conductor, preferably gold 31, overlying a layer of silicon dioxide ($SiO_2$) 33. Preferably centrally located in the die is a honeycomb structure 35 for thermal isolation and structural protection of the microbridge heater/sensor 45.

A detailing of the honeycomb structure from a bottom view is provided in FIG. 4 for the edification of the reader. Both the through-the-wafer electrical vias 29 and the honeycomb structure 35 may be accomplished by deep reactive ion etching machines such as offered by Surface Technology Systems U.S.A., Incorporated, a company located in Redwood City, Calif. The silicon body 27 has a top surface 37 and a bottom surface 39. Adhered to the top surface is a first layer 41 of silicon dioxide serving passivation and structural functions. A similar silicon dioxide layer is adhered to the bottom surface 39. The silicon dioxide layers for the top and bottom surfaces may be formed in one pass, or serially, depending upon the capabilities of the fabrication facility.

Overlaying the silicon dioxide first layer 41 on the top and bottom surfaces of the silicon body 13 is a second layer 43 of silicon nitride ($Si_3N_4$) serving passivation/structural functions. As will be recognized, the oxide and nitride layers may be used herein for passivation or structural purposes, or both. It will be noted that there is no silicon nitride layer overlaying the silicon dioxide layer in the electrical vias 29, and that neither layer interferes with the extension of the gold electrical conductor plating 31 in the vias. It will be appreciated that other compositions of the structural/passivation layers may be suitably selected to serve the same function within the scope of the present invention. Overlaying the second layer 43 of the top surface 37 is the deposited platinum heating and sensing elements 45 including the electrical leads, or contacts 47 therefore, which in turn contact the gold plating 31 of the vias 29.

A third layer 49 of silicon nitride is then preferably placed over the heater sensor and leads 45, 47 respectively. The third layer 49 extends to the second layer 43 of the top surface 37 in order to provide a planar, or substantially planar, top cap for the silicon microsensor structure 21. In some instances where the liquid to be measured has observed scaling effects, such as water, a scale inhibitor layer 51 composed of polysulfone or the like may be desirably adhered to the third layer 49 to further protect the upper surface, or top cap, of the microsensor die 21.

Over the second layer 43 on the bottom surface 39 of silicon body 13 is preferably placed additional thermocompression bonding material 53 such as additional gold or other suitable material for attachment of the sensor die 21 to the substrate 23.

Referencing FIG. 5, the substrate 23 comprises a body 55 comprised of alumina, mullite, or other known materials having coefficient of thermal expansion (CTE) suitably matched to the microsensor structure 21. The body 55 has a top surface 57 and a bottom surface 59. Attached to the top surface 57 preferably, and if necessary to provide a vapor barrier between the substrate 23 and the microsensor structure 21, is a glazing layer 61 comprised of suitable glass or other barrier material preventing the passage of vapor to the microsensor structure 21. At the top surface of the substrate structure 23 which is to be mated with the silicon microsensor structure 21 there is located additional thermocompression bond material 67 to be mated with the thermocompression bond material 53 of the microsensor structure 21.

Formed in the substrate structure body 55 and any covering layers, such as glazing 61, are throughholes 63 which are plated with an electrically conductive material 65 such as copper or the like. As CTE considerations are not as critical in the construction of the substrate structure 23, the throughholes 63 may be plated to the point at which they are filled. At the top surface 57 of the substrate structure 23, and overlaying the copper plated throughholes 63, is an electrically conductive thermocompression bonding material 67 for mating with the electrically conductive thermocompression bond material 31 of the through-the-wafer electrical vias 29 of the microsensor structure 21. This may be preferably applied as gold for all electrically conductive and thermocompression bond purposes. However, it will be appreciated that other materials may be applied to form the electrical contacts as well as the thermocompression bond between the microsensor 21 and its substrate 23. It will be appreciated that the materials for the thermocompression bond or other means of adherement need not exclusively be electrically conductive. However, it is believed that the use of a single bonding material such as gold will aid in the ease of manufacture while providing a tight seal for the honeycomb thermoisolation structure 35 and preventing wicking into the honeycomb structure 35 which might disrupt or alter its thermoisolation capabilities. All areas of the bottom of the die 21 which will not interfere with the electrical connection between the vias 29 and the plated throughholes 65 may be covered with gold. Corresponding gold covered areas on the substrate may be used in order to provide a very strong and fluid tight physical bond between the microsensor structure and the substrate.

A typical fabrication scenario would be as follows. On the silicon die first grow a 0.5 micrometer (micron) oxide layer on the top and bottom surfaces. Next deposit a 0.3 micron LPCVD silicon nitride layer over the thermo-oxide layer. Next etch the oxide and nitride from the top side as necessary for deposition of the heater/sensor structure and formation of the vias thereto, as necessary. A platinum layer, actually a layered stack of 600 angstroms chrome oxide 550 angstroms of platinum and 600 angstroms chrome oxide, is then deposited A 0.2 micron LPCVD nitride deposition masking layer is then accomplished and patterned. The platinum stack is then ion milled and a 1 micron LPCVD nitride deposition is placed over the patterned and milled platinum of the heater/sensor.

The microsensor structure is then approached from the back side and the oxide and nitride layers on the bottom surface are etched in preparation for the deep reactive ion etching of the silicon. The silicon is then etched with the deep reactive ion etch forming the cylindrical throughholes of the vias and the honeycomb structure. This etch is stopped at the platinum stack of the heater and sensor leads 47. The chrome oxide is then etched using a nichrome etchant. The silicon walls of the vias are then passivated via a growth of 0.1 micron thermo-oxide followed by a sputtering and plating of the via walls with one micron of gold. The gold is then masked patterned and etched for suitable electrical contact and bonding areas. The photopolymer is mask patterned so that the through-the-wafer vias are protected. A deep reactive ion etch of the silicon is then performed to form the honeycomb structure underneath the sensor element. The microsensor package is then thermocompression bonded via the application of heat and pressure to the substrate structure as detailed above. An epoxy or similar seal around the edges of the chip-substrate interface may then be placed to further seal the edges. The top cap 25 may then be applied to the surface area of the substrate 23 to surround the die 21 via the application of epoxy, epoxy preforms, or preformed substrate material or the like in order to provide a planar top surface of the sensor package with no step-up from the surface area to the die 21.

The honeycomb structure will prevent the sensor membrane from excessive flexure and bursting while the planar top surface of the die prevents contamination, as does the through-the-wafer electrical contacts which lack the customary wire bond debris trap. Further, according to the preferred embodiment the use of a membrane structure provides a flat surface with no passage from the top surface to the thermo-isolation area in which condensates or debris can lodge to harm the operation of the sensor.

It will be appreciated by the ordinarily skilled artisan that the present invention offers many advantages and that the detailed structure of the preferred embodiment prevents several solutions to a myriad of problems. It will be recognized that various structures of the preferred embodiment may have counterparts substituted therefor when the unique advantages of that particular element are not desired for a selected sensor application. The present invention is thus only to be limited by the appended claims.

Having thus described the invention what is claimed is:

The embodiments of the invention in which an exclusive property or right is claimed are defined as follows:

1. A thermal fluid sensor comprising:
   a silicon microsensor die having a body with
   a) top and bottom surfaces and
   b) a central honeycombed portion extending between said top and bottom surfaces; and
   c) a sensor overlaying said honeycomb portion.

2. The sensor according to claim 1 further including:
   a first layer of silicon oxide ($SiO_2$) adhered to the top and bottom surfaces, the top surface of the honeycombed portion.

3. The sensor according to claim 2, further including:
   a second layer of silicon nitride ($Si_3N_4$) covering the first layer where it covers the top and bottom surfaces, including the top, but not the bottom, surface of the honeycombed portion.

4. The sensor according to claim 3, further including:
   through-hole vias outside of the honeycombed area extending between said top and bottom surfaces, the walls of said vias being coated with a first layer of oxide.

5. The sensor according to claim 4, further including:
   heating and sensing elements overlaying the vias and the second layer of the top surface and being located substantially over said honeycomb portion.

6. The sensor according to claim 5, further including:
   the via first layer being plated with an electrical conductor, the electrical conductor extending to the heating and sensing elements at the top surface and covering, or extending beyond, the second layer on the bottom surface.

7. The sensor according to claim 6 further including:
   thermocompression bonding material covering portions of the second layer covering the bottom surface.

8. The sensor according to claim 7 further including:
   a third layer of nitride covering the sensor and portions of the second layer and serving as a substantially planar top cap for the die.

9. The sensor of claim 1 further comprising:
   a substrate structure bonded to the silicon microsensor die comprising;
   a body composed of material having a coefficient of thermal expansion compatible with the silicon die and having: top & bottom surfaces;
   the top substrate surface being bonded to the bottom surface of the microsensor die.

10. The sensor according to claim 9 further including:
    through-holes plated with an electrical conductor extending from the substrate top surface to the substrate bottom surface.

11. The sensor of claim 4 further comprising:
    a substrate structure bonded to the silicon microsensor die comprising;
    a body composed of material having a coefficient of thermal expansion compatible with the silicon die and having: top and bottom major surfaces;
    the top substrate surface being bonded to the bottom surface of the microsensor die.

12. The sensor according to claim 11 further including:
    a through-hole between the top and bottom substrate surfaces, the substrate throughhole having electrical conductive material compatible with, and connected to, a via of the microsensor die electrical conductors thereon;
    the bottom surface of the throughholes having sufficient electrical conductor as to be capable of attachment to further electrical conductors for operation of the sensor.

13. The sensor according to claim 9 further including:
    a glazing layer on the top surface of the substrate body for fluid barrier.

14. The flow sensor according to claim 11 further including:
    a glazing layer on the top surface of the body for moisture barrier.

15. The sensor of claim 9 further comprising:
    a top surround body of material having suitable coefficient of thermal expansion and being constructed and arranged to surround the die, the surround body being of substantially equal thickness to the die in order to provide a flush top surface of the microsensor die and substrate assembly, the surround being adhered to the substrate.

16. The sensor of claim 11 further comprising:
    a top surround body of material having suitable coefficient of thermal expansion and being constructed and arranged to surround the die, the surround body being of substantially equal thickness to the die in order to provide a flush top surface of the microsensor die and substrate assembly, the surround being adhered to the substrate.

17. A thermal fluid sensor comprising:
    a silicon microsensor die having a body with
    a) top and bottom die surfaces and
    b) through-hole vias therein and
    c) a central void
    d) a first passivation/structural layer adhered to the top and bottom surfaces and the through-hole via walls;
    e) a second passivation/structural layer covering the first layer where it covers the top & bottom surfaces;

f) a micromembrane heater/sensor overlaying the vias and the second layer of the top surface and being located substantially over the central void;

g) the via first layer covering being plated with an electrical conductor, the electrical conductor extending to the heater/sensor at the top surface and covering, or extending beyond, the second layer on the bottom surface;

h) bonding material covering portions of the second layer on the bottom surface; and i) a third layer of passivation/insulation material covering the heater/sensor and portions of the second layer and serving as a substantially planar top cap for the die.

18. The sensor of claim 17 further comprising:

a substrate structure bonded to the silicon microsensor die comprising;

a) a body composed of material having a coefficient of thermal expansion compatible with the silicon die and having:

b) top & bottom substrate surfaces;

c) the top substrate surface having thermocompression material thereon bonded to the thermocompression material of the bottom surface of the die;

d) through-holes plated with an electrical conductor extending from the substrate top surface to bottom surface, the through-holes having at the top substrate surface electrically conductive material compatible with, and connected to, the vias of the die electrical conductors thereon; and e) the bottom substrate surface of the throughholes having sufficient electrical conductor as to be capable of attachment to further electrical conductors for operation of the sensor.

19. The sensor of claim 18 further comprising:

a top surround body of material having suitable coefficient of thermal expansion and constructed and arranged to surround the die, the surround body being of substantially equal thickness to the die, in order to provide a flush top surface of the microsensor die and substrate assembly, the surround being adhered to the die.

20. A thermal fluid sensor comprising a silicon microsensor die having a body with a) top and bottom die surfaces and b) through-hole vias therein extending between said top and bottom surfaces, and c) a central honeycombed portion therethrough;

d) a first layer of silicon dioxide adhered to the top and bottom surfaces, the top surface of the honeycombed portion, and the through-hole walls;

e) a second layer of silicon nitride covering the first layer where it covers the top & bottom surfaces, including the top, but not the bottom, surface of the honeycombed portion;

f) a platinum heater/sensor overlaying the vias and the second layer of the top surface and being located substantially over said honeycomb portion;

g) the via first layer covering being plated with an electrical conductor, the electrical conductor extending to the heater/sensor at the top surface and covering, or extending beyond, the second layer on the bottom surface;

h) thermocompression bonding material covering major portions of the second layer covering the bottom surface discontinuous with the via electrical conductor material at the bottom surface; and i) a third layer of nitride covering the heater sensor and portions of the second layer and serving as a substantially planar top cap for the die.

21. The sensor of claim 20 further comprising:

a substrate structure bonded to the silicon microsensor die comprising;

a) a body composed of material having a coefficient of thermal expansion compatible with the silicon die and having:

b) top & bottom substrate surfaces c) the top substrate surface having thermocompression material thereon bonded to the thermocompression material of the bottom surface of the die;

d) through-holes plated with an electrical conductor extending from the substrate top surface to bottom surface, the through-hole at the top surface having electrical conductive material compatible with, and connected to the vias of the die electrical conductors thereon;

e) the bottom surface of the throughholes having sufficient electrical conductor as to be capable of attachment to further electrical conductors for operation of the chip; and f) a moisture barrier layer on the top surface of the substrate body.

22. The sensor of claim 21 further comprising:

a top surround body of material having suitable coefficient of thermal expansion, the surround body being of substantially equal thickness to the die in order to provide a flush top surface of the microsensor die and substrate assembly, the surround being adhered to the substrate, which is bigger than the die.

* * * * *